United States Patent

[11] 3,608,839

| [72] | Inventor | Gunnar Rindal Fagerholt<br>Copenhagen-Valby, Denmark |
|---|---|---|
| [21] | Appl. No. | 10,687 |
| [22] | Filed | Jan. 21, 1970 |
| [23] | | Division of Ser. No. 688,732, Dec. 7, 1967, abandoned. |
| [45] | Patented | Sept. 28, 1971 |
| [73] | Assignee | F. L. Smidth & Co.<br>New York, N.Y. |
| [32] | Priority | Dec. 8, 1966 |
| [33] | | Great Britain |
| [31] | | 55091/66 |

[54] APPARATUS FOR MAKING ULTRAFINE CEMENT
2 Claims, 2 Drawing Figs.

[52] U.S. Cl............................................... 241/65,
241/153, 241/181
[51] Int. Cl........................................B02c 17/06,
B02c 21/00
[50] Field of Search........................................... 241/65,
153, 152, 176, 181, 184, 23, 30, 70–72

[56] References Cited
UNITED STATES PATENTS

| 1,649,813 | 11/1927 | Dalgaard...................... | 241/30 |
| 1,728,496 | 9/1929 | Lindhard...................... | 241/23 |
| 3,008,656 | 11/1961 | Weston ........................ | 241/30 |
| 3,144,212 | 8/1964 | Klovers ....................... | 241/72 X |

Primary Examiner—Donald G. Kelly
Attorney—Pennie, Edmonds, Morton, Taylor & Adams ABSTRACT: Hydraulic cement of very high strength is ground to a fineness corresponding to a specific surface of 6,000 cm. $^2$/g. or more as measured by the Blaine method by grinding the clinker to the fineness of ordinary Portland cement, cooling the cement to about room temperature and then grinding the cooled cement by small grinding bodies having an average weight of no more than 6 grams.

PATENTED SEP 28 1971　3,608,839
FIG. I
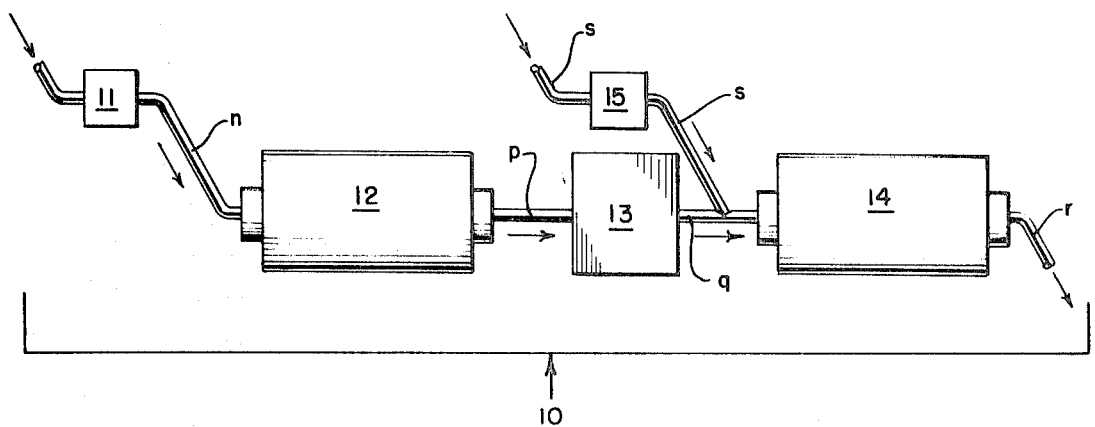
FIG. 2
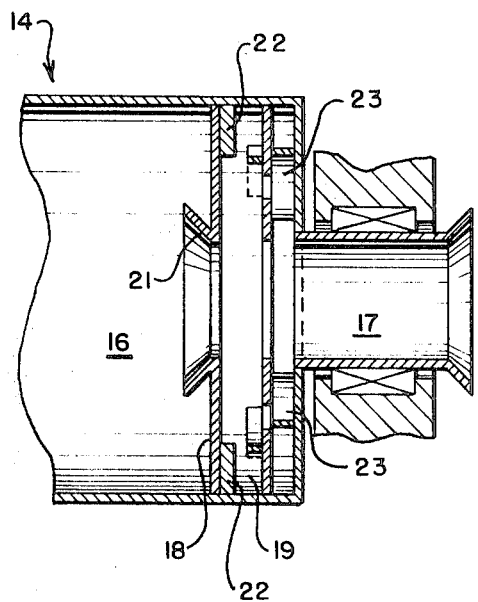
INVENTOR
GUNNAR RINDAL FAGERHOLT
BY [signature]
ATTORNEYS

APPARATUS FOR MAKING ULTRAFINE CEMENT

This is a division of application Ser. No. 688,732 filed Dec. 7, 1967 and abandoned July 1, 1970.

BACKGROUND OF THE INVENTION

This invention relates to a method of manufacturing ultrafine cement and to a plant for performing the method.

It is well known that hydraulic cement of very high strength, in particular early high strength, is produced by grinding cement clinker to a fineness corresponding to a specific surface of 6,000 cm.$^2$/g. or more measured according to the Blaine method. Such fine grinding to produce what may be called ultrafine cement is usually performed in a ball or pebble mill. In the grinding process a considerable amount of heat is developed with consequent rise in the overall temperature in the mill.

This is undesirable, primarily because the cement may be impaired, for instance because of dehydration of gypsum in it, thus upsetting the balance of the composition and in consequence the setting properties and resulting in loss of strength of the final product. In addition the high temperature may damage mechanical parts of the mill plant, for instance bearings. Again, the heat developed may raise the temperature of air drawn through the mill to so high a value as to damage a bag filter or an electrostatic precipitator for the removal of dust from air drawn through the mill. In particular, if the temperature of the air is above 120° C. the precipitation in an electrostatic precipitator is substantially reduced. Moreover the higher the temperature in the mill, the more pronounced is the tendency for the grinding bodies and the mill lining to become coated with fine cement so that the grinding bodies become less effective. This coating of the grinding bodies may be reduced to some extent by using so-called grinding aids, but even then it is possible to grind only comparatively small amounts of clinker, so the throughput must be kept down, as otherwise the grinding is not sufficiently fine.

The demand for ultrafine cement is increasing, and our main object in the present invention is to devise a new and improved method of manufacturing it.

SUMMARY OF THE INVENTION

Broadly stated the method of the invention is an improvement in the manufacture of ultrafine cement in which cement clinker is ground to a fineness of ordinary Portland cement, the ground clinker is cooled and then the cooled cement is ground in a mill with the use of grinding bodies having a maximum average weight of about 6 grams.

Ordinary Portland cement is a hydraulic cement generally consisting of various silicates of calcium which when mixed with water, sand and gravel or other substance forms the common material of construction. It has a fineness which usually corresponds to a specific surface of from 3,000 to 5,000 cm.$^2$/g. measured by the Blaine method, is readily available and constitutes a very suitable starting material in the production of ultrafine cement. Because the preliminary grinding of the clinker to a fineness corresponding to that of Portland cement is performed in another mill, and not in that in which the ultrafine grinding takes place, heat developed in the preliminary grinding does not increase the temperature attained in the final grinding. Cooling the starting material before feeding it to the mill in which the ultrafine cement is produced means that less cooling is needed during the grinding and so a higher mill output is obtainable.

In grinding clinker such very small grinding bodies would have no effect as their individual weights would be too small compared to the weight of the pieces of clinker, but in grinding Portland cement to an ultrafine cement they are found to have excellent grinding efficiency. It is also found that such very small grinding bodies do not become coated to any appreciable extent even in the absence of grinding aids.

However, the grinding according to the invention is further improved by an addition of a grinding aid, for example, triethanolamine.

The Portland cement that is ground to the ultrafine cement may be obtained from a storage silo in which it has been stored for some time and thus allowed to cool to or nearly to room temperature, but preferably the whole manufacture is continuous, the cement clinker being ground to the fineness of ordinary Portland cement in a conventional mill, and the ground cement then being passed through a cooler from which it flows to a mill to be ground to ultrafine cement by very small grinding bodies. A suitable cooler is a compartment cooler in which heat exchange takes place between cement fluidized in the compartment and water in external contact with the walls of the compartment.

In known mills in which coarse material is ground by means of a charge of loose grinding bodies it is common to divide the interior of the mill into two or more grinding chambers separated by perforated partitions, commonly known as diaphragms. Normally each chamber has a charge of grinding bodies, the size of which depends on the degree of fineness required in the ground product. The diaphragms serve essentially as screens in allowing the ground material to pass but in retaining the grinding bodies. At the exit of the last chamber of the mill, or at the exit of mills having only one chamber, there is usually a similar diaphragm to prevent the grinding bodies from leaving the mill. The ground material may leave the mill directly through a diaphragm that constitutes the end wall of a grinding chamber or, in the overflow type of mill, it may leave through a hollow trunnion having a diaphragm at its entrance. If very small grinding bodies are used in such a mill they tend to clog the perforated diaphragm that is provided to retain them. The mill used for the ultrafine grinding according to the invention is preferably a tube mill with a hollow trunnion at the outlet end and (as described in U.S. application Ser. No. 647,152) has a built-in dam ring constituting a partition between a grinding chamber and a discharge chamber that leads to the trunnion, the discharge chamber being furnished with means for returning the grinding bodies to the grinding chamber through the dam ring. Thus the very small grinding bodies are continuously returned from the discharge chamber at substantially the same rate as they enter it, and at the most only a small proportion leaves the mill with the ground product. The ultrafine cement itself flows out of the mill without any hindrance and is discharged without requiring any auxiliary machinery, whereas in the normal methods of grinding ultrafine cement the ground cement is carried out of the mill entrained in a current of air.

The invention includes as a novel plant a mill for grinding cement clinker to ordinary Portland cement, a cooler for cooling this cement, and a mill having a charge of very small grinding bodies, all working in series, the mill preferably including a dam ring and a discharge chamber as described above. Since this preferred form of mill has no conventional diaphragm, there is no risk of diaphragm clogging nor any need to replace worn grinding bodies. Even very small worn grinding bodies have a grinding effect.

BRIEF DESCRIPTION OF THE DRAWING

FIG. 1 is a flowsheet of a method of the invention; and
FIG. 2 is a section through the discharge end of the ultrafine cement mill in this plant.

DESCRIPTION OF THE PREFERRED EMBODIMENT

In the plant 19 illustrated by FIG. 1 cement clinker and any minor amounts of supplementary constituents, such as gypsum, flow as continuous streams to a weighing and feeding station 11 at which there are separate weighing and feeding units, one for each of the constituents to be subsequently ground together to Portland cement. These units are so interconnected that the various constituents are delivered in the proportions required for the desired analyses of the ultrafine cement. From the weighing and feeding station 11 the mixture flows as a continuous stream $n$ to a conventional tube mill 12 for producing Portland cement. The ground cement leaves the mill as a continuous stream $p$ and enters a cement cooler 13.

From this the Portland cement, cooled nearly to room temperature, flows as a continuous stream $q$ into a grinding mill 14 in which it is ground to ultrafine cement by the very small grinding bodies, and the resultant ultrafine cement leaves the mill 14 as a continuous stream $r$. A grinding aid is fed through a dosing mechanism 15 as a stream $s$ to the mill 14 together with cooled Portland cement.

In each of the mills 12 and 14 water is injected in small amounts in order to control the temperature inside the mills and to establish a humidified atmosphere so as to protect the gypsum against dehydration. The resultant controlled increase in the moisture content of the air drawn through the mills is advantageous in that the air is thus appropriately conditioned for subsequent passage through an electrostatic precipitator for removal of dust.

FIG. 2 shows the outlet end of the mill 14 in vertical section. The mill has a grinding chamber 16 and a hollow trunnion 17. projecting centrally from the end wall 24 of the mill which is also the end wall of grinding chamber 16. Spaced inwardly from end wall 24 of the grinding chamber has a dam ring 18 with a central opening surrounded by a frustoconical ring 21 projecting centrally from the end wall 24 of the mill. On the outlet side of the dam ring 18 there is a discharge chamber 19 with a central discharge opening leading to the hollow trunnion 17. Around this there are scoops 23 for lifting the ultrafine cement and assisting it to enter the trunnion. Scoops 23 are supported between end wall 24 and disc 25 having a central opening aligned with the opening in dam ring 18.

The grinding chamber 16 contains a charge of very small grinding bodies. These are largely prevented from leaving the chamber 16 by the frustoconical ring 21. Those that pass into the discharge chamber 19 are engaged by lifters 22 which extend radially inwardly from the inner cylindrical surface of the discharge chamber 19 are and may be mounted on dam ring 18. The lifters are adapted to lift the grinding bodies from the lower portion of the discharge chamber, where grinding bodies accumulate, to a point above the ground material in the discharge chamber where, upon falling from the lifters, the grinding bodies tend to pass back through the aperture in the dam ring 18 due to the turbulence occurring within the discharge chamber; it is found that in operation the grinding bodies are returned by these lifters to the chamber 16 at substantially the same rate as they enter the chamber 19.

Additional discharge chambers may be formed by the provision of one or more further dam rings identical to the dam ring 18, as described in our U.S. Pat. application, Ser. No. 647,152 if required in order to improve the separation of grinding bodies from the ultrafine cement.

I claim:

1. In apparatus for producing very high strength hydraulic cement by grinding cement clinker to a fineness corresponding to a specific surface of at least 6,000 cm.$^2$/g., said apparatus including a first mill for grinding cement clinker to ordinary Portland cement fineness and a cooler for cooling said Portland cement discharged from said mill the improvement in combination therewith which comprises:
    a. a second mill for receiving the cooled Portland cement from said cooler and for subjecting it to further grinding, said second mill including:
        1. an end wall having an outwardly projecting hollow trunnion having a discharge opening therethrough,
        2. a grinding chamber bounded at the discharge end by said end wall,
        3. a charge in the grinding chamber of grinding bodies whose maximum average weight is about 6 grams,
        4. a solid dam-ring spaced inwardly from said end wall and forming therewith a discharge chamber for the material ground to a surface of at least 6,000 cm.$^2$/g., said dam ring having a central opening into said chamber, and
    b. means associated with said dam ring for returning grinding bodies to the grinding chamber of the mill while passing said ground material unhindered through the mill.

2. In apparatus for producing very high strength hydraulic cement by grinding cement clinker to a fineness corresponding to a specific surface of at least 6,000 cm.$^2$/g. said apparatus including a first mill for grinding cement clinker to ordinary Portland cement fineness and a cooler for cooling said Portland cement discharged from said mill, the improvement in combination therewith which comprises:
    a. a second mill for receiving the cooled Portland cement from said cooler and for subjecting it to further grinding, said second mill including:
        1. an end wall having an outwardly projecting hollow trunnion having a discharge opening,
        2. a grinding chamber pointed at the discharge end by said end wall,
        3. a charge in the grinding chamber of grinding bodies whose maximum average weight is about 6 grams,
        4. a dam ring spaced inwardly from said end wall and forming therewith a discharge chamber for the material ground to a surface of at least 6,000 cm.$^2$/g., and
    b. said dam ring having a discharge opening in line with the hollow trunnion with an inwardly flaring frustoconical ring surrounding said discharge opening and projecting into said grinding chamber, and lifters extending radially inwardly and mounted on the outer surface of the dam ring for raising grinding bodies which pass through the dam ring from the lower portion of said discharge chamber and allowing them to fall in the vicinity of said discharge opening to be returned therethrough to the grinding chamber.